UNITED STATES PATENT OFFICE.

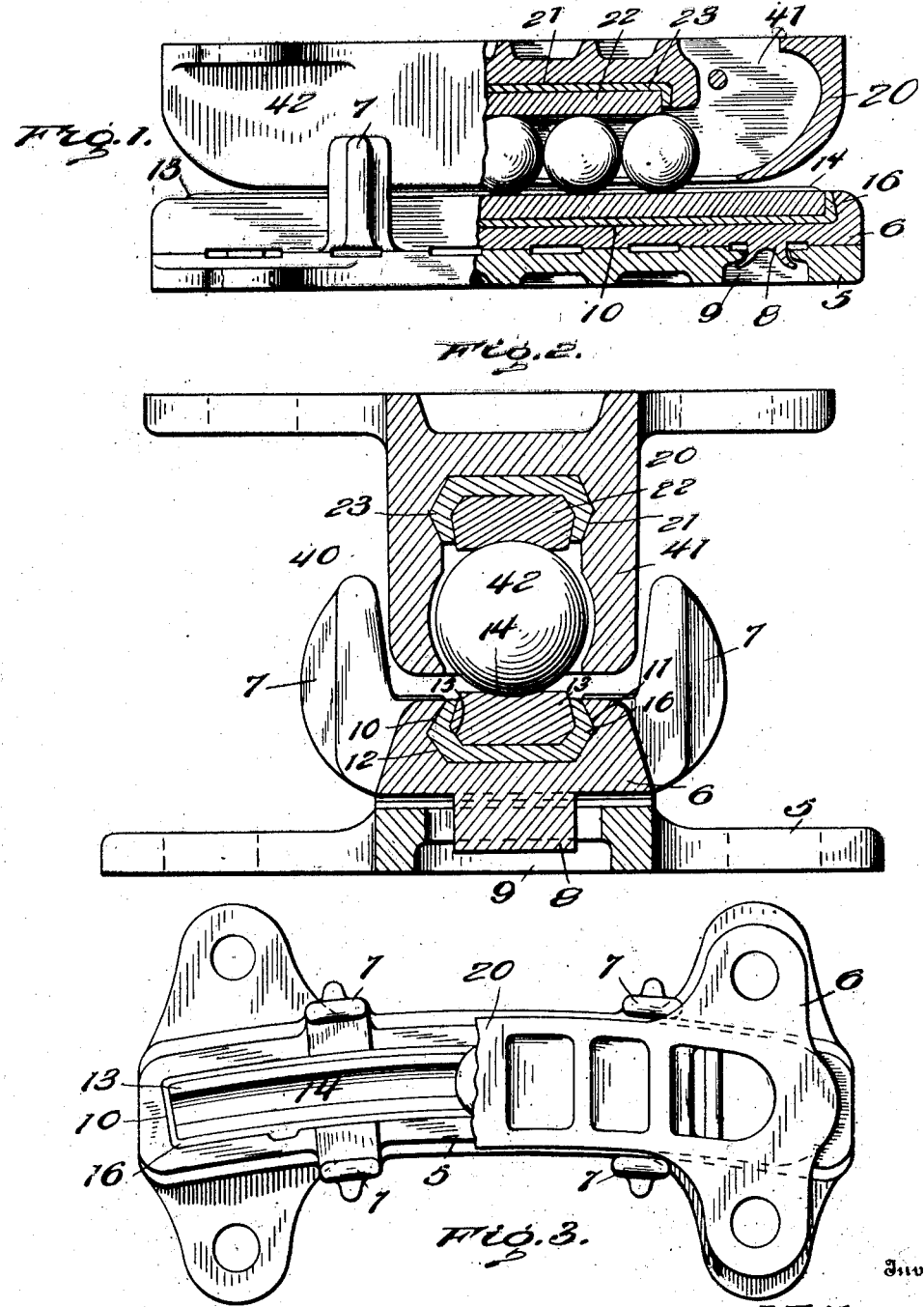

JOHN E. NORWOOD, OF BALTIMORE, MARYLAND, ASSIGNOR TO THE T. H. SYMINGTON COMPANY, OF BALTIMORE, MARYLAND.

SIDE BEARING FOR CARS.

No. 905,743.  Specification of Letters Patent.  Patented Dec. 1, 1908.

Application filed May 31, 1905. Serial No. 263,060.

*To all whom it may concern:*

Be it known that I, JOHN E. NORWOOD, a citizen of the United States, residing at Baltimore, in the State of Maryland, have invented certain new and useful Improvements in Side Bearings for Cars; and I do hereby declare the following to be a full, clear, and exact description of the invention, such as will enable others skilled in the art to which it appertains to make and use the same.

This invention relates to bearings for cars and more particularly to ball bearings as employed at the sides of car trucks. As this class of bearings are ordinarily constructed, race plates are employed for direct engagement by the anti-friction devices, the race plates being of tempered steel and held in casings or frames of malleable iron.

The object of the present invention is to provide a composite bearing member including a base or frame, a race plate and ready means for securing the plate in the base or frame, wherein two opposed bearing members will have their race plates in proper relation to each other, that is in parallelism, without the necessity of machining the bases or casings, where the race plates attach.

A further object of the invention is to mount the race plates in such manner as to insure against breaking of the race plates when subjected to uneven pressure at different points of their lengths, thus permitting of the use of hard steel.

In the drawings forming a portion of this specification and in which like numerals of reference indicate similar parts in the several views, Figure 1 is a vertical section taken longitudinally through a side bearing embodying the present invention. Fig. 2 is a vertical section taken transversely through the side bearing. Fig. 3 is a top plan view of the structure shown in Fig. 1, a portion of the upper bearing casing being omitted.

Referring now to the drawings, and more particularly to Figs. 1 and 2 thereof, there is shown a side bearing similar in structure to that shown in the United States Letters Patent No. 759,304, granted to me, and wherein there is employed a lower bearing member including a base plate 5 upon which is mounted a laterally slidable plate 6 which rests between the upwardly directed arms 7 at the sides of the plate 5 and at each end thereof, the plate 6 having depending stems 8 that enter transverse slots 9 in the plate 5 and are flared at their lower ends to prevent withdrawal and thus serve to hold the plates 5 and 6 together, while permitting movement of the plate 6 upon the plate 5 laterally.

In the upper face of the movable plate 6 is a longitudinally extending arc-shaped slot 10, the side and end walls of which are beveled inwardly or cut-under as shown at 11, said side and end walls from the lower edges of the bevels 11 to the bottom of the recess, being disposed at an angle to the bevels as shown at 12. In connection with the movable plate 6, there is employed an arc-shaped race plate 13 having a transversely curved groove 14 ground in its upper face and extending longitudinally thereof. The maximum width of the race plate 13 is slightly less than the width of the top of the groove 10, so that the race plate may enter the groove to which it corresponds in curvature, and the race plate 13 is tapered upwardly from its central longitudinal portion of maximum width, the bottom of the race plate being beveled as shown at 15 so that when the race plate is in the groove 10, the beveled faces 15 will be parallel with the faces 12 while the faces 11 will converge upwardly toward the corresponding side and end faces of the upwardly tapered portion of the race plate. Between the race plate and the face of the groove 10 is cast a seal 16 of type metal which by reason of its expansion in its heated state, serves to tightly grip and hold the race plate, at the same time forming a seat which is yieldable to a degree that will prevent snapping of the race plate when subjected to uneven pressure or to sudden blows. With this seal, it will be readily understood that there is formed a seat for the race plate from which the latter cannot by any possible means be drawn, any flow of the type metal under the influence of pressure upon the race plate being prevented by the gradually diminishing space through which the metal would have to flow in its upward course.

The upper bearing casing 20 is the same in general structure as that described in the patent above referred to and has a groove or channel 21 similar in all respects to the groove or channel 10 and in which is disposed a race plate 22 identical with the race plate 13 and held in place by a type metal seal 23 the same in all respects as the seal 16.

In placing the race plate, it is suspended in the groove or channel by means of a magnet or a series of magnets, after the race plate has been tempered and ground on its grooved side, and after said plate is in proper position so that it will be horizontal when mounted upon a truck bolster, the seal is poured into place. The casting of the seal does not sufficiently heat the race plate to draw its temper but to insure positively against any such tendency, the seal may be cooled immediately after it is in place, by means of water or in any other suitable manner.

The upper plate 20 of the side bearings illustrated has the depending flanges 40 and 41 between which are held balls 42 that bear against the race plates 13 and 22.

What is claimed is:—

In a side bearing for cars, a base plate, a second plate imposed on said base plate and formed with a groove having its opposite longitudinal sides beveled and inclined inwardly on each side of their longitudinally disposed central line, a race plate disposed within said groove and having a central longitudinal portion of maximum width, said race plate having its side faces tapered towards its outer surfaces and in opposite directions on each side of their longitudinally disposed central line, the tapered side faces of said race plate being disposed in spaced convergent relation to the adjacent inclined faces of said grooves, and a seal of type metal interposed between the faces of said groove and the adjacent faces of said race plate.

In testimony whereof, I affix my signature, in presence of two witnesses.

JOHN E. NORWOOD.

Witnesses:
 GEO. H. CHANDLEE,
 M. E. TUCKER.